US012159613B2

(12) United States Patent
Baroghel et al.

(10) Patent No.: US 12,159,613 B2
(45) Date of Patent: Dec. 3, 2024

(54) METHOD AND CONTROL UNIT FOR OPERATING A NOISE SUPPRESSION UNIT OF A VEHICLE

(71) Applicant: Bayerische Motoren Werke Aktiengesellschaft, Munich (DE)

(72) Inventors: Cedric Baroghel, Munich (DE); Werner Foag, Munich (DE); Hubert Scholz, Munich (DE); Lorenzo Valent, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/801,173

(22) PCT Filed: Jan. 28, 2021

(86) PCT No.: PCT/EP2021/051905
§ 371 (c)(1),
(2) Date: Aug. 19, 2022

(87) PCT Pub. No.: WO2021/165004
PCT Pub. Date: Aug. 26, 2021

(65) Prior Publication Data

US 2023/0060935 A1 Mar. 2, 2023

(30) Foreign Application Priority Data

Feb. 19, 2020 (DE) ..................... 10 2020 104 301.5

(51) Int. Cl.
*G10K 11/178* (2006.01)

(52) U.S. Cl.
CPC .... *G10K 11/1783* (2018.01); *G10K 11/17855* (2018.01); *G10K 11/17875* (2018.01);
(Continued)

(58) Field of Classification Search
CPC ......... G10K 11/1783; G10K 11/17855; G10K 11/17875; G10K 2210/124; G10K 2210/3016; G10K 2210/3047
See application file for complete search history.

(56) References Cited

U.S. PATENT DOCUMENTS

2010/0172510 A1* 7/2010 Juvonen ........... G10K 11/17873 381/71.1
2017/0232915 A1 8/2017 Dufford
(Continued)

FOREIGN PATENT DOCUMENTS

| | | | |
|---|---|---|---|
| DE | 10 2017 113 603 | A1 | 12/2017 |
| JP | 4847371 | B2 | 12/2011 |
| WO | WO 2018/173112 | A1 | 9/2018 |

OTHER PUBLICATIONS

International Search Report (PCT/ISA/210) issued in PCT Application No. PCT/EP2021/051905 dated May 6, 2021 with English translation (five (5) pages).
(Continued)

*Primary Examiner* — David L Ton
(74) *Attorney, Agent, or Firm* — Crowell & Moring LLP

(57) ABSTRACT

An apparatus for operating a noise suppression unit of a vehicle includes a control unit. The control unit is configured to reduce interfering noise in or on the vehicle by generating at least one acoustic compensation signal. The control unit is also configured to determine noise information relating to expected interfering noise, including an expected level of interfering noise, at an upcoming vehicle position while the vehicle is traveling. The control unit is also configured to cause the noise suppression unit to be activated or to be in an energy-saving mode at the upcoming vehicle position, depending on the noise information obtained.

13 Claims, 2 Drawing Sheets

(52) U.S. Cl.
CPC .................. *G10K 2210/124* (2013.01); *G10K 2210/3016* (2013.01); *G10K 2210/3047* (2013.01)

(56) References Cited

U.S. PATENT DOCUMENTS

| | | | |
|---|---|---|---|
| 2017/0372690 | A1 | 12/2017 | Valeri et al. |
| 2019/0228789 | A1 | 7/2019 | Alfano et al. |

OTHER PUBLICATIONS

German-language Written Opinion (PCT/ISA/237) issued in PCT Application No. PCT/EP2021/051905 dated May 6, 2021 (nine (9) pages).
German-Language Searcy Report issued in German Application No. 10 2020 104 301.5 dated Feb. 23, 2021 with partial English translation (12 pages).

* cited by examiner

METHOD AND CONTROL UNIT FOR OPERATING A NOISE SUPPRESSION UNIT OF A VEHICLE

BACKGROUND

The disclosure relates to a method and a corresponding control unit for controlling a noise suppression unit of a vehicle which is designed to implement an active noise suppression (Active Noise Cancelling) algorithm.

A vehicle can have a noise suppression unit. Active Noise Cancelling (ANC) can be used, for example, to reduce engine noise and/or tire noise that may be perceived as disturbing by a passenger inside the vehicle.

Example components of a noise suppression unit are one or more accelerometers, microphones, control units, speakers, and software. The one or more accelerometers detect vibrations, e.g. on the vehicle bodywork. The one or more microphones (in the vehicle interior) measure the (interfering) noise that occurs and generate a measurement signal that represents the noise in the vehicle interior. The measurement signal can be combined with the acceleration signal from the one or more accelerometers and is used to generate a compensation signal. The compensation signal is converted by one or more loudspeakers in the vehicle interior into vibrations, which interfere destructively with the noise to be suppressed and thus lead to noise cancellation. By continuously acquiring the measurement signal and/or the acceleration signal, the compensation signal can be continuously adjusted to produce continuous noise suppression.

The use of a noise suppression unit can reduce the amount of sound isolation and/or vibration dampers required in a vehicle, thereby reducing the cost, installation space requirements and/or the weight of the vehicle. On the other hand, the operation of a noise suppression unit results in a certain (electrical) energy consumption by the vehicle.

In an electrically powered vehicle, the engine noise of an internal combustion engine is absent. In this case, interfering noise that is not caused by the drive motor, such as tire noise, can be perceived as unpleasant by an occupant of the vehicle as this interfering noise is no longer masked by the engine noise.

SUMMARY

This document deals with the technical object of reducing or suppressing interfering noise in a vehicle, in particular interfering noise caused to the vehicle by an external source such as the road surface, in a particularly energy-efficient way.

The object is achieved by each of the independent claims. Advantageous embodiments are specified in the dependent claims, among others. It should be noted that additional features of a patent claim that is dependent on an independent claim, without the features of the independent claim or only in combination with a subset of the features of the independent claim, may constitute a separate invention which is independent of the combination of all the features of the independent patent claim and which may become the subject matter of an independent claim, a divisional application, or a subsequent application. This applies equally to technical teachings described in the description, which may constitute an invention independently of the features of the independent claims.

According to one aspect, a control unit for operating a noise suppression unit of a (motor) vehicle is described. The noise suppression unit can be designed to reduce interfering noise in or on the vehicle, in particular in a passenger compartment and/or inside the vehicle, by generating at least one acoustic compensation signal. The noise suppression unit can be designed to implement an Active Noise Cancelling, ANC, algorithm to generate the at least one compensation signal, thereby reducing interfering noise in or on the vehicle.

The control unit can be configured to determine noise information relating to expected interfering noise, in particular relating to the expected level of interfering noise, at an upcoming vehicle position while the vehicle is traveling. In other words, it is possible to predict the level of interfering noise in or on the vehicle (in particular in the passenger compartment of the vehicle) at the upcoming vehicle position. Furthermore, noise information can be determined which indicates whether the expected interfering noise at the upcoming vehicle position will be such that it can be at least partially suppressed or reduced by the noise suppression unit. For example, a predicted spectral composition of the expected interfering noise at the upcoming vehicle position can be determined.

This can be used to predict the expected interfering noise attributable to an external excitation of the vehicle, in particular an excitation due to the road surface on which the vehicle is traveling.

In this context, the control unit can be configured to predict (e.g. based on a planned driving route and/or vehicle trajectory) the vehicle position at which the vehicle will be located at an upcoming point in time (e.g. at a point in time between 100 ms and 1 second in the future). The upcoming vehicle position can thus be predicted at a specific upcoming point in time. Based on this, the level of interfering noise and/or the composition of the interfering noise at the predicted upcoming vehicle position can be estimated.

The level and/or the composition of the interfering noise can be predicted, for example, on the basis of a digital map for the road or street network used by the vehicle. Alternatively or in addition, the level of interfering noise and/or the composition of the interfering noise can be predicted on the basis of environmental data from one or more environment sensors (e.g. a camera, a radar sensor, a lidar sensor, etc.) of the vehicle. For example, on the basis of environmental data (e.g. on the basis of the image data of a camera), information can be determined regarding the road surface material and/or regarding a pothole on the road surface on which the vehicle is traveling. Based on this, the interfering noise information can then be determined. In particular, the level and/or the composition of the interfering noise can be determined based on this.

In particular, the control unit may be configured to determine position data in relation to a current position of the vehicle and/or in relation to the upcoming vehicle position (e.g. by means of a position sensor, such as a GPS receiver, of the vehicle). The position data can indicate (GPS) coordinates of the respective position. The noise information can then be determined accurately based on the position data and on a digital map of a road network on which the vehicle is traveling. Map data relating to the digital map can be obtained from a vehicle-external unit via a wireless communication link and/or from a memory unit of the vehicle.

The digital map may comprise position-dependent data relating to road surface-induced interfering noise in or on a vehicle and/or relating to the (recommended) activation of a noise suppression unit of a vehicle. The digital map may have been determined, for example, on the basis of location-dependent noise data relating to actually occurring interfering noise during a plurality of previous journeys.

In particular, the digital map can provide a position-dependent indication, for a plurality of different road sections of the road network, of characteristic values of one or more characteristics of the road section in question, in particular of characteristics which have an influence on interfering noise in or on a vehicle. Examples of characteristics are: a measure of a degree of roughness and/or an extent of unevenness in the surface of the section of road in question; a profile of the surface of the section of road in question; and/or a measure of a vertical-dynamic excitation of a vehicle by the surface of the section of road in question.

The control unit can be configured to determine the noise information for the road section at the upcoming vehicle position accurately, on the basis of the characteristic values of the one or more of the characteristics of the road section.

Alternatively or in addition, the digital map can comprise, for the plurality of different road sections of the road network, a position-dependent indicator of the level of interfering noise caused by the surface of the road section in question, in particular statistically and/or empirically, in or on a vehicle. Alternatively or in addition, the digital map can comprise a position-dependent indicator for the plurality of different road sections of the road network, that indicates whether or not the noise suppression unit of a vehicle should be activated for the road section in question. The control unit of the vehicle can be configured to determine the noise information for the road section at the upcoming vehicle position accurately on the basis of the indicator provided.

The digital map can comprise, possibly for a multiplicity of different vehicle types, different position-dependent data relating to road surface-induced interfering noise in or on a vehicle and/or relating to the activation of a noise suppression unit of a vehicle. In other words, the digital map data may be vehicle-type dependent. The control unit can be configured to determine the noise information on the basis of the digital map, taking into account the type of the vehicle. By taking into account the vehicle type, the accuracy of the noise information can be further increased with regard to the expected interfering noise at the upcoming vehicle position.

Alternatively or in addition, the control unit can be configured to determine environmental data in relation to an upcoming road section in the direction of travel, wherein the environmental data can include, in particular, sensor data of at least one environment sensor of the vehicle. The noise information with regard to expected interfering noise at the upcoming vehicle position can then be determined accurately (possibly also) on the basis of the environmental data.

The control unit is also configured to ensure, depending on the noise information obtained, that the noise suppression unit is activated or in an Active mode (to generate an acoustic compensation signal to suppress interfering noise) at the upcoming vehicle position, or is in an energy-saving mode (so that the noise suppression unit does not generate an acoustic compensation signal to suppress interfering noise).

In particular, the control unit can be configured to cause the noise suppression unit to be activated or to be in an Active mode at the upcoming vehicle position if the noise information indicates that the expected level of interfering noise at the upcoming vehicle position is greater than or equal to a (pre-defined) interfering-noise threshold. Alternatively or in addition, the control unit can be configured to cause the noise suppression unit to be in an energy-saving mode at the upcoming vehicle position if the noise information indicates that the expected level of interfering noise at the upcoming vehicle position is lower than the interfering-noise threshold.

This enables the position-dependent activation or deactivation of the noise suppression unit of a vehicle. This allows the energy consumption of the noise suppression unit to be reduced in an efficient and reliable manner.

The noise suppression unit can have a plurality of different energy-saving modes, each with different start-up times, to activate the noise suppression unit (i.e. to switch to the Active mode). Examples of energy-saving modes are a background mode in which at least parts of the noise suppression unit remain active in the background to allow a relatively short start-up time, a standby mode with a medium start-up time, or an off mode with a relatively long start-up time. The energy consumption of the noise suppression unit can vary depending on the economy mode. Typically, the energy consumption decreases with increasing start-up time.

The control unit can be configured to determine, based on the noise information, in which energy-saving mode from the plurality of different energy-saving modes to operate the noise suppression unit at the upcoming vehicle position and/or the current vehicle position. When deciding which energy-saving mode to use, the current state of the noise suppression unit and/or the distance between the current vehicle position and the upcoming vehicle position may be taken into account. By taking into account and/or using different energy-saving modes, the vehicle's energy consumption can be further reduced and the comfort in the vehicle further increased.

The control unit can be configured to determine noise data in relation to the level of interfering noise in or on the vehicle at the current vehicle position. The noise data may include sensor data of at least one microphone and/or at least one vibration sensor and/or accelerometer of the vehicle, or may be based on sensor data of at least one microphone and/or at least one vibration sensor and/or accelerometer of the vehicle. The control unit can therefore determine and/or acquire noise data depending on position.

The position-dependent noise data can then be provided and/or used (directly in the vehicle) for creating and/or updating the digital map. For example, the position-dependent noise data can be sent to a vehicle-external unit (e.g. to a backend server) in order to enable the vehicle-external unit (based on the position-dependent noise data of a plurality of vehicles) to determine an accurate digital map. The digital map can then comprise position-dependent data relating to road surface-induced interfering noise in or on a vehicle and/or relating to the (recommended) activation or deactivation of a noise suppression unit of a vehicle.

According to a further aspect, a control unit for a vehicle is described. The aspects described in this document can also be applied to this control unit, either individually or in combination.

The control unit can be configured to determine noise data related to the level (e.g. intensity) of interfering noise in or on the vehicle (in particular inside the vehicle) at a current vehicle position while the vehicle is traveling. The noise data can be determined on the basis of sensor data of at least one microphone and/or at least one vibration sensor of the vehicle.

In addition, the control unit can be configured to provide and/or use the position-dependent noise data for creating and/or updating a digital map. A digital map can be created and/or updated that includes position-dependent data relating to road surface-induced interfering noise in or on a vehicle (in particular inside a vehicle) and/or relating to the (recommended) activation or deactivation of a noise suppression unit of a vehicle.

According to another aspect, a unit for updating a digital map for a road network is described. The unit can be either part of a vehicle or a separate vehicle-external unit (e.g. a backend server). The digital map can comprise position-dependent data relating to road surface-induced interfering noise in or on a vehicle and/or relating to the (recommended position-dependent) activation of a noise suppression unit of a vehicle.

The unit can be configured to determine, for a plurality of journeys by one or more vehicles on the road network, position-dependent noise data relating to a level of interfering noise in or on the vehicle in question (in particular to receive such data via a communication link). Furthermore, the unit is configured to update the digital map based on the position-dependent noise data for the plurality of trips. In particular, the unit can be configured to crowd-source position-dependent noise data to determine and provide an accurate digital map.

According to another aspect a (road) motor vehicle is described (in particular a passenger car or truck, or a bus), which comprises one or more of the control units described in this document.

According to another aspect, a method for operating a noise suppression unit of a vehicle is described, which is designed to reduce interfering noise in or on the vehicle by generating at least one acoustic compensation signal (i.e. a sound signal). The method comprises determining noise information relating to expected interfering noise, in particular relating to an expected level of interfering noise, at an upcoming vehicle position while the vehicle is traveling. The method also comprises ensuring that the noise suppression unit is activated or is in an energy-saving mode at the upcoming vehicle position, depending on the noise information obtained.

According to another aspect, a method is described for providing a digital map for a road network in which a vehicle is moving. The method comprises determining noise data relating to a level of interfering noise in or on the vehicle at a current vehicle position while the vehicle is traveling, wherein the noise data is determined in particular on the basis of sensor data of at least one microphone and/or at least one vibration sensor of the vehicle. The method also comprises providing and/or using the noise data for creating and/or updating a digital map.

According to another aspect, a method for updating a digital map for a road network is described. The digital map can comprise position-dependent data relating to road surface-induced interfering noise in or on a vehicle and/or relating to the (recommended) activation of a noise suppression unit of a vehicle. The method comprises determining, for a plurality of journeys by one or more vehicles in the road network, position-related noise data in relation to a level of interfering noise in or on the vehicle in question. The method also comprises updating the digital map based on the position-dependent noise data for the plurality of journeys.

According to a further aspect, a software (SW) program is described. The SW program can be configured to be executed on a processor (e.g. on a control unit of a vehicle), and thereby to execute at least one of the methods described in this document.

According to a further aspect, a storage medium is described. The storage medium can comprise a SW program which is designed to be executed on a processor and thereby to execute at least one of the methods described in this document.

It is important to note that the methods, devices and systems described in this document can be used both alone and in combination with other methods, devices and systems described in this document. In addition, all aspects of the methods, devices and systems described in this document can be combined with one another in a wide variety of ways. In particular, the features of the claims can be combined with one another in a variety of ways.

Hereafter, the invention is described in more detail by reference to exemplary embodiments. In the drawings:

DETAILED DESCRIPTION OF THE DRAWINGS

Figure 1:
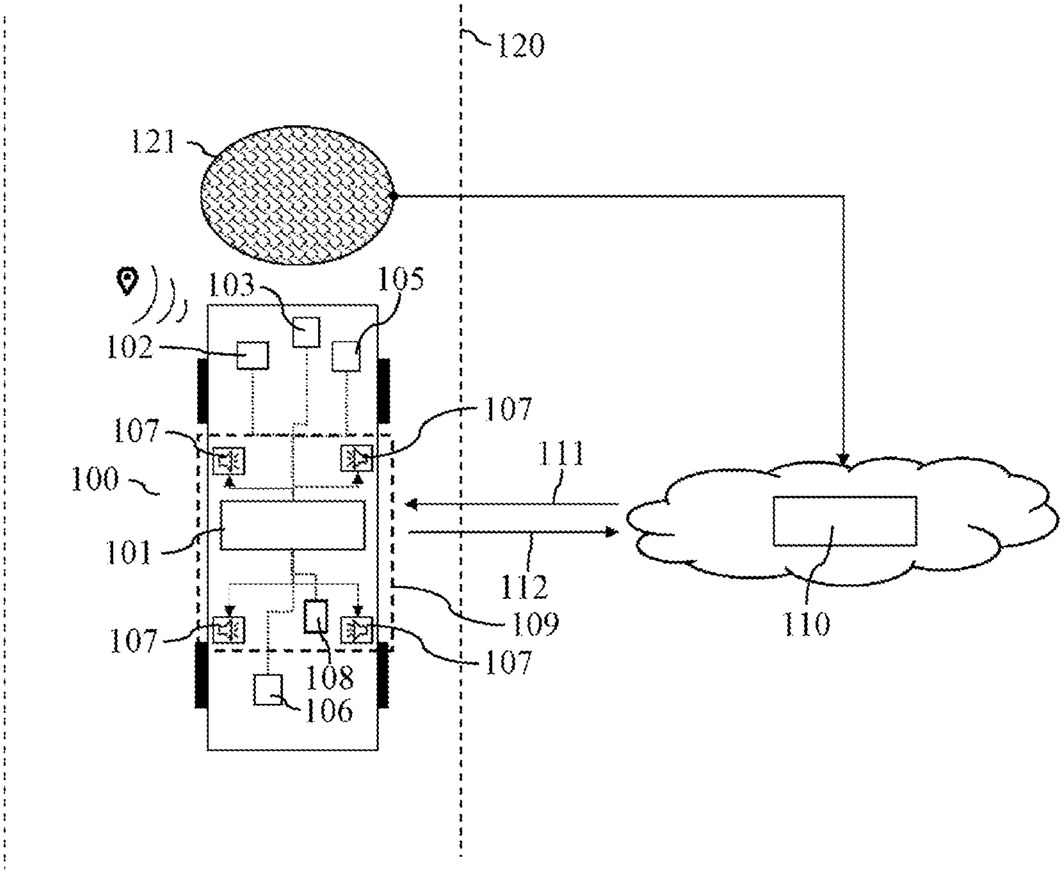
FIG. 1 shows an exemplary vehicle with a noise suppression unit.

As explained at the beginning, this document deals with the operation of a noise suppression unit of a vehicle in the most energy-efficient way. In this context, FIG. 1 shows an exemplary vehicle 100 with a noise suppression unit, abbreviated to ANC unit, 109. The ANC unit 109 comprises one or more microphones 108 which are configured to acquire measurement signals relating to noise in at least one position (e.g. at the driver's position or a passenger's position) of the vehicle 100. A control unit 101 of the vehicle 100, in particular the control unit 101 of the ANC unit 109, is configured to generate one or more compensation signals for one or more loudspeakers 107 based on the measurement signals of the one or more microphones 108. By playing back the one or more compensation signals via the one or more loudspeakers 107, it is possible at least partially to suppress interfering noise at the at least one position of the vehicle 100.

The operation of the ANC unit 109 can cause a certain amount of energy consumption. The ANC unit 109 can have one or more energy-saving modes that can typically reduce the energy consumption of the ANC unit 109, but also the available functionality of the ANC unit 109. Examples of energy-saving modes are:

- a Background mode in which the measurement signals of one or more microphones 108 are still at least partially acquired and evaluated and, if applicable, one or more compensation signals are determined, but in which the compensation signals are not output via the one or more loudspeakers 107 (and thus no noise suppression is performed). The Background mode enables a particularly fast, even instantaneous, activation of the ANC unit 109 for noise suppression (i.e. a particularly short start-up time);
- a Standby mode in which the ANC unit 109 may operate in a basic mode to allow a relatively fast activation of the ANC unit 109 (but which is typically longer than in the Background mode); and/or
- an Off mode in which the ANC unit 109 is (fully) deactivated and the activation of the ANC unit 109 typically takes longer than in the Standby mode.

The power consumption of the ANC unit 109 is typically lower in the Off mode than in the Standby mode, and lower in the Standby mode than in the Background mode, and lower in the Background mode than in the Active mode.

The control unit 101 of the vehicle 100 can be designed to predict, while the vehicle 100 is traveling, whether the ANC unit 109 should or must be operated at an upcoming vehicle position in order to suppress interfering noise, or whether interfering noise at the upcoming vehicle position will be low enough that the ANC unit 109 can be put into an energy-saving mode. In particular, the control unit 101 can be configured to predict the level of the interfering noise present at an upcoming vehicle position. Based on the predicted level of the interfering noise, it can then be ensured that the ANC unit 109 will be operated at the upcoming vehicle position or that the ANC unit 109 will be in an energy-saving mode at the upcoming vehicle position. Thus, the energy consumption of the vehicle 100 can be reduced.

The vehicle 100 can comprise a position sensor 102, which is configured to collect position data (i.e. sensor data, e.g. GPS coordinates) relating to the position of the vehicle 100. The position data can be evaluated in conjunction with a digital map of the road network being used by the vehicle 100, in order to determine the road or road surface 120 on which the vehicle 100 is traveling and/or in order to predict the road surface 120 on which the vehicle 100 will be traveling at a future point in time (e.g. in 100 ms or more, or in 1 second or more).

The digital map can include data relating to one or more characteristics 121 of the road surface 120 relevant to the generation of interfering noise in the vehicle 100. For example, the digital map can indicate one or more road surface characteristics 121 that affect the vertical dynamics of the vehicle 100. In another example, the digital map can directly indicate the level of interfering noise that is produced at different positions of the road network, in particular on different roads 120 or road sections. The digital map with the interfering noise-related data can be provided, for example, by a vehicle-external (backend) unit, in particular by a server 110 via a wireless communication interface in the vehicle 100 (shown in FIG. 1 by the arrow 111).

The control unit 101 of the vehicle 100 can thus be configured to predict the level of interfering noise on an upcoming road section based on the position data of the position sensor 102 and on the basis of a digital map. Based on the predicted level of interfering noise, the ANC unit 109 can then be operated or switched to an energy-saving mode.

Alternatively or in addition, the vehicle 100 can include one or more environment sensors 103 (e.g. a radar sensor, a lidar sensor, a camera, an ultrasound sensor, etc.), which are configured to acquire environmental data (i.e. sensor data) relating to the environment of the vehicle 100 located ahead of the vehicle 100 in the direction of travel of the vehicle 100. In particular, environmental data can be acquired in relation to the road surface 120 ahead of the vehicle 100 in the direction of travel. The control unit 101 can be configured to predict the level of interfering noise in an upcoming road section (possibly also) based on the environmental data.

The control unit 101 can be configured to acquire and/or obtain sensor data relating to the level of interfering noise and/or vibrations in or on the vehicle 100, in particular in connection with the operation of the ANC unit 109. For this purpose, the measurement signals of the one or more microphones 108 and/or sensor data of one or more accelerometers and/or vibration sensors 105 of the vehicle 100 can be evaluated. In other words, the control unit 101 can be configured to determine noise data relating to the level of interfering noise at the current position of the vehicle 100, based on the sensor data of the one or more microphones 108 and/or the one or more accelerometers and/or vibration sensors 105 of the vehicle 100. The noise data can be used to create and/or update a digital map which provides information relating to the level of interfering noise to be expected for different positions in a road network and/or for different road surfaces 120 or road sections.

An interfering-noise database can therefore be created, which (as explained above) can be used to activate the ANC unit 109 of a vehicle 100 or switch it into an energy-saving mode depending on position. The interfering-noise database may comprise vehicle type-dependent interfering-noise information relating to the extent of the expected interfering noise in a vehicle 100 of the relevant vehicle type. This allows for a particularly energy-efficient operation of the ANC unit 109 of a vehicle 100.

This document describes an ANC system or an ANC unit 109 (and a corresponding method for operating an ANC unit 109) that is not permanently activated while a vehicle 100 is traveling, but can be activated or deactivated or switched into an energy-saving mode (e.g. into a Standby mode) depending on the situation, so that the energy consumption of the ANC unit 109 can be reduced. In the Standby mode, the ANC unit 109 is typically not completely shut down, but the ANC unit 109 has a lower computing power and/or lower energy consumption of sensors 105, 108 than in the active state or the Active mode of the ANC unit 109.

The activation or transition into an energy-saving mode of the ANC unit 109 can be performed on the basis of information received from a backend server 110, for example. The information can comprise, in particular, location-related information regarding the road condition, the roughness and/or vertical dynamics (e.g. in the form of a digital map for a road network). The information can be retrieved by the vehicle 100 based on its location. On the basis of the information retrieved, the target state of the ANC unit 109 (activated or in an energy-saving mode) can be determined and the system state of the ANC unit 109 can be changed or maintained accordingly.

In an exemplary scenario, the road 120 currently being driven on and/or lying ahead may be in good condition and may not show any unique abnormal vertical events such as transverse joints, edges, drain covers or potholes. According to the road information retrieved from the digital map, any unwanted driving noises occurring in the interior of the vehicle 100 can be ignored. The ANC System 109 can then be put into the Standby mode to reduce power consumption.

Advantageously, a digital map containing information on the road condition, the roughness and/or vertical dynamics can be used not only as an information database for controlling an ANC unit 109, but the digital map can also be used for other purposes in a vehicle 100 (e.g. for controlling and/or regulating the driving dynamics). Alternatively or in addition, the digital map can be stored in a memory unit 106 of the vehicle 100 and retrieved from there if required. One or more of these measures can be used to further reduce the energy consumption of the vehicle 100.

Alternatively or in addition, an environment sensor system, in particular an imaging sensor system 103, of the vehicle 100 (which is used, for example, for safety functions such as pedestrian detection, automatic emergency braking and/or for automatic clearance control, in particular ACC) can be used to activate the ANC unit on demand. On the basis of the environmental data, road surface irregularities on a road surface 120 can be detected before the wheels of the vehicle 100 pass over them. Alternatively or in addition, indicators of the surface roughness of the road surface 120 can be determined with a particular geometrical and/or temporal resolution. The environmental data, in particular the image data, can be evaluated if necessary with an artificial neural network (e.g. a convolutional neural network) and/or using artificial intelligence, in order to determine noise information relating to expected interfering noise.

The two data sources (digital map and/or analysis of the road surface based on environmental data) can be combined to determine particularly precisely whether the ANC unit 109 should be active or in an energy-saving mode at a given position.

The sensors of the vehicle 100, in particular the environmental sensors 103 and/or the noise sensors 108 and/or the vibration sensors 105, can be used to determine and/or update the noise-relevant (position-dependent) data of a digital map. The noise-relevant data of a digital map can thus be learned. For this purpose, noise data 112 can be sent from the vehicle 100 to a vehicle-external unit 110. The vehicle-external unit 110 can be designed to evaluate the noise data 112 of a plurality of vehicles 100 in order to determine position-dependent, noise-related data of a digital map of a road network and to provide it as required.

A learning function can thus be provided, to learn position-dependent, noise-related data for a digital map. If, for example, on the basis of the measurement signals of the one or more microphones 108 of a vehicle 100, it is detected that the interfering noise level with a non-activated ANC unit 109 regularly exceeds an interfering-noise threshold at a specific position on the road network and is identified by the ANC unit 109 as "compensatable", e.g. on the basis of the characteristic frequency distribution of the interfering noise, this section of road can be recorded in a digital onboard map and/or digital backend map as a section of road where the ANC unit 109 should be activated. Learning a digital map allows a position-dependent activation of the ANC unit 109 of a vehicle 100 in a particularly precise manner.

Figure 2A:
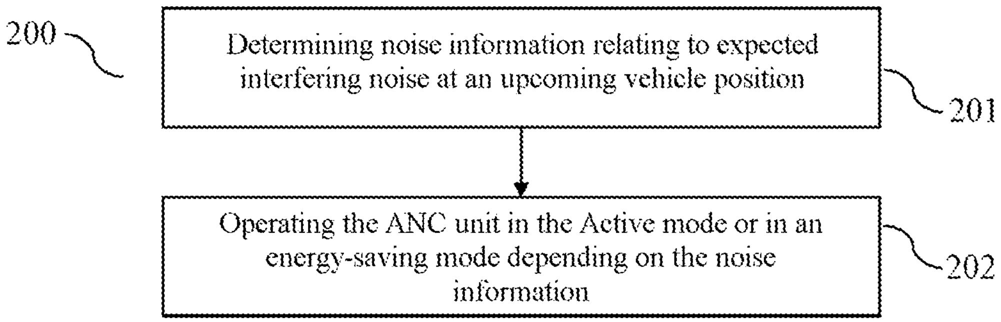
FIG. 2*a* shows a flowchart of an exemplary method for operating a noise suppression unit of a vehicle.

FIG. 2*a* shows a flow diagram of an exemplary (computer-implemented) method 200 for operating a noise suppression unit 109 of a vehicle 100. The noise suppression unit 109 (also referred to in this document as an ANC unit or ANC system) can be designed to reduce or suppress interfering noise in or on the vehicle 100 by generating at least one acoustic compensation signal. In particular, interfering noise in a passenger compartment or in an interior of the vehicle 100 can be reduced or suppressed.

The method 200 comprises determining 201 noise information relating to expected interfering noise, in particular relating to an expected level of interfering noise, at an upcoming vehicle position while the vehicle 100 is traveling. In particular, the noise information can indicate how severe the interfering noise is expected to be at an upcoming vehicle position. In addition, the noise information can indicate the expected type of the interfering noise and/or whether or not the interfering noise can be expected to be reduced or suppressed by the operation of the noise suppression unit.

The noise information can be determined, for example, on the basis of a digital map for a road network, wherein the digital map indicates road surface information depending on position, from which the expected level of interfering noise can be estimated. Alternatively or in addition, the noise information can be determined on the basis of the environmental data of one or more environment sensors 103 of the vehicle 100.

The method 200 also comprises ensuring 202, depending on the determined noise information, that the noise suppression unit 109 will be activated at the upcoming vehicle position (and thus will generate a compensation signal to suppress the interfering noise) or will be in an energy-saving mode (and thus will not generate a compensation signal to suppress the interfering noise). In particular, this can ensure that the noise suppression unit 109 will be activated at the upcoming vehicle position if the noise information indicates that the expected level of interfering noise at the upcoming vehicle position will be above a predefined interfering-noise threshold (and possibly that the interfering noise at the upcoming vehicle position is expected to be suppressed by operating the noise suppression unit 109). On the other hand, it can be ensured that the noise suppression unit 109 will be in an energy-saving mode at the upcoming vehicle position. In this way, the energy consumption of the noise suppression unit 109 can be reduced in a reliable and efficient manner.

Figure 2B:
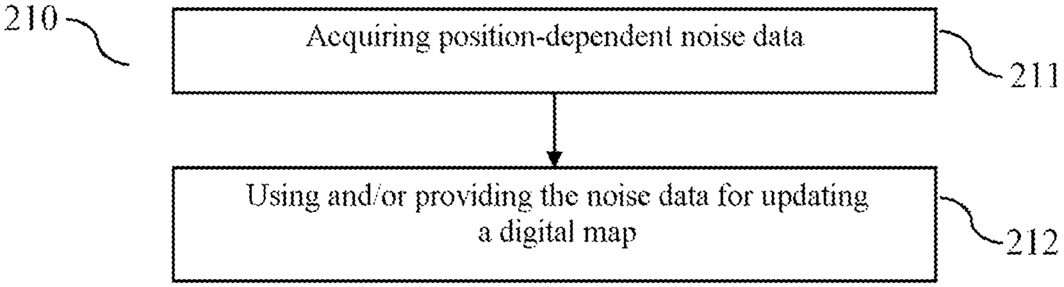
FIG. 2*b* shows a flowchart of an exemplary method for providing noise data.

FIG. 2*b* shows a flowchart of an exemplary method 210 for providing a digital map for a road network in which a vehicle 100 is moving. The method 100 can be performed by a control unit 101 of a vehicle 100 that comprises a noise suppression unit 109, or that also might not comprise a noise suppression unit 109.

The method 210 comprises determining 211 noise data 112 relating to the level of interfering noise in or on the vehicle 100 at a current vehicle position while the vehicle 100 is traveling. The noise data 112 can include, for example, the sensor data of at least one microphone 108 and/or at least one vibration sensor 105 of the vehicle 100. This means that noise data 112 can be acquired depending on position while the vehicle 100 is traveling.

The method 210 also comprises providing and/or using the noise data 112 for creating and/or updating a digital map. For example, the noise data 112 can be used directly by the vehicle 100 to update the digital map directly in the vehicle 100. Alternatively or in addition, the noise data 112 can be provided to a vehicle-external unit 110 which is designed to update a digital map based on the noise data 112 of a plurality of vehicles 100.

The digital map (determined and/or updated by the vehicle 100 and/or by a vehicle-external unit 110) can include position-dependent data relating to road surface-induced interfering noise in or on a vehicle 100 and/or relating to the activation (recommended or to be omitted, as appropriate) of a noise suppression unit 109 of a vehicle 100. The digital map can be provided and/or used (as described in this document) to activate the noise suppression unit 109 of a vehicle 100 or switch it into an energy-saving mode, depending on position.

The measures described in this document can be used to adapt the use of an ANC system 109 according to requirements and/or the current situation. In this way, the energy efficiency of a vehicle 100 can be increased. This is particularly relevant for an electrically powered vehicle 100, in which road noise typically represents a relatively large proportion of the interfering noise and where reducing the electrical energy consumption can typically significantly increase the range of the vehicle 100.

The present invention is not limited to the exemplary embodiments shown. In particular, it is important to note that the description and the figures are intended only as examples to illustrate the principle of the proposed methods, devices, and systems.

The invention claimed is:

1. An apparatus for operating a noise suppression unit of a vehicle, comprising:

a control unit which is configured to:

reduce interfering noise in or on the vehicle by generating at least one acoustic compensation signal, determine noise information relating to expected interfering noise, including an expected level of interfering noise, at an upcoming vehicle position while the vehicle is traveling, cause the noise suppression unit to be activated or to be in an energy-saving mode at the upcoming vehicle position, depending on the noise information obtained, determine environmental data relating to an upcoming road section, wherein the environmental data comprises sensor data of an environment sensor of the vehicle, and determine the noise information based on the environmental data.

2. The apparatus according to claim 1, wherein the control unit is also configured to:

obtain position data in relation to a current position of the vehicle and/or in relation to the upcoming vehicle position; and determine the noise information based on the position data and on a digital map in relation to a road network used by the vehicle.

3. The apparatus according to claim 2, wherein:

the digital map provides a position-dependent indication, for a plurality of different road sections of the road network, of characteristic values of one or more characteristics of the road section in question which have an influence on interfering noise in or on a vehicle;

the control unit is configured to determine the noise information for a road section at the upcoming vehicle position on the basis of the characteristic values of the one or more of the characteristics of the road section; and the one or more characteristics include:

a measure of a degree of roughness and/or a level of unevenness of a surface of the road section;

a profile of the surface of the road section; and/or a measure of a vertical-dynamic excitation of a vehicle by the surface of the road section.

4. The apparatus according to claim 3, wherein the digital map comprises, for a plurality of different road sections of the road network, a position-dependent indicator of the level of interfering noise caused by a surface of the road section in question, statistically and/or empirically, in or on a vehicle; and/or the digital map comprises a position-dependent indicator for a plurality of different road sections of the road network, that indicates whether or not the noise suppression unit of a vehicle should be activated for the road section in question.

5. The apparatus according to claim 4, wherein the digital map comprises position-dependent data relating to road surface-induced interfering noise in or on a vehicle and/or relating to the activation of a noise suppression unit of a vehicle for a multiplicity of different vehicle types; and the control unit is configured to determine the noise information based on the digital map, taking into account the vehicle type of the vehicle.

6. The apparatus according to claim 5, wherein the control unit is also configured to obtain map data in relation to the digital map for the upcoming vehicle position from a vehicle-external unit via a wireless communication link and/or from a memory unit of the vehicle.

7. The apparatus according to claim 1, wherein the noise suppression unit has a multiplicity of different energy-saving modes, each with different start-up times, configured to activate the noise suppression unit; and the control unit is also configured to determine, based on the noise information, in which energy-saving mode from the plurality of different energy-saving modes to operate the noise suppression unit at the upcoming vehicle position and/or at a current vehicle position.

8. The apparatus according to claim 7, wherein the control unit is also configured to:

ensure that the noise suppression unit is activated at the upcoming vehicle position in order to generate an acoustic compensation signal to suppress interfering noise if the noise information indicates that the expected level of interfering noise at the upcoming vehicle position is greater than or equal to an interfering-noise threshold; and/or ensure that the noise suppression unit is in an energy-saving mode at the upcoming vehicle position so that the noise suppression unit does not generate an acoustic compensation signal to suppress interfering noise when the noise information indicates that the expected level of interfering noise at the upcoming vehicle position is less than the interfering-noise threshold.

9. The apparatus according to claim 8, wherein the control unit is also configured to:

at a current position, to collect noise data relating to a level of interfering noise in or on the vehicle, wherein the noise data includes sensor data of at least one microphone and/or at least one vibration sensor of the vehicle; and provide and/or use the noise data for creating and/or updating a digital map, wherein the digital map comprises position-dependent data relating to road surface-induced noise in or on a vehicle and/or relating to the activation of a noise suppression unit of a vehicle.

10. An apparatus for a vehicle, comprising:

a control unit that is configured to:

determine noise data relating to a level of interfering noise in or on the vehicle at a current vehicle position while the vehicle is traveling, wherein the noise data is collected in particular based on sensor data of at least one microphone and/or at least one vibration sensor of the vehicle, provide and/or use the noise data for creating and/or updating a digital map, wherein the digital map comprises position-dependent data relating to road surface-induced interfering noise in or on a vehicle and/or relating to the activation of a noise suppression unit of a vehicle, and determine environmental data relating to an upcoming road section, wherein the environmental data comprises sensor data of an environment sensor of the vehicle, and determine the noise information based on the environmental data.

11. A method for operating a noise suppression unit of a vehicle, which is designed to reduce interfering noise in or on the vehicle by generating at least one acoustic compensation signal; wherein the method comprises;

determining noise information relating to expected interfering noise, relating to the expected level of interfering noise, at an upcoming vehicle position while the vehicle is traveling;

ensuring that the noise suppression unit is activated at the upcoming vehicle position or is in an energy-saving mode, depending on the noise information obtained;

determining environmental data relating to an upcoming road section, wherein the environmental data comprises sensor data of an environment sensor of the vehicle, and determining the noise information based on the environmental data.

12. A method for providing a digital map for a road network in which a vehicle is moving, the method comprising:

determining noise data relating to a level of interfering noise in or on the vehicle at a current vehicle position while the vehicle is traveling; wherein the noise data is determined in particular on the basis of sensor data from at least one microphone and/or at least one vibration sensor of the vehicle;

providing and/or using the noise data for creating and/or updating a digital map, wherein the digital map comprises position-dependent data relating to road surface-induced interfering noise in or on a vehicle and/or relating to the activation of a noise suppression unit of a vehicle;

determining environmental data relating to an upcoming road section, wherein the environmental data comprises sensor data of an environment sensor of the vehicle, and determining the noise information based on the environmental data.

13. An apparatus for updating a digital map for a road network, comprising:

a unit, wherein the digital map comprises position-dependent data relating to road surface-induced interfering noise in or on a vehicle and/or relating to the activation of a noise suppression unit of a vehicle, wherein the unit is configured to:

for a plurality of journeys by one or more vehicles on the road network, determine position-dependent noise data in relation to the level of interfering noise in or on the vehicle in question;

update the digital map based on the position-dependent noise data for the plurality of journeys;

determine environmental data relating to an upcoming road section, wherein the environmental data comprises sensor data of an environment sensor of the vehicle, and determine the noise information based on the environmental data.

* * * * *